Aug. 8, 1967  H. VON RÖNN  3,334,698
LEVEL-BALANCE BEAM SCALE WITH ECCENTRICALLY
MOUNTED COUNTERWEIGHT
Filed Nov. 18, 1965  4 Sheets-Sheet 4

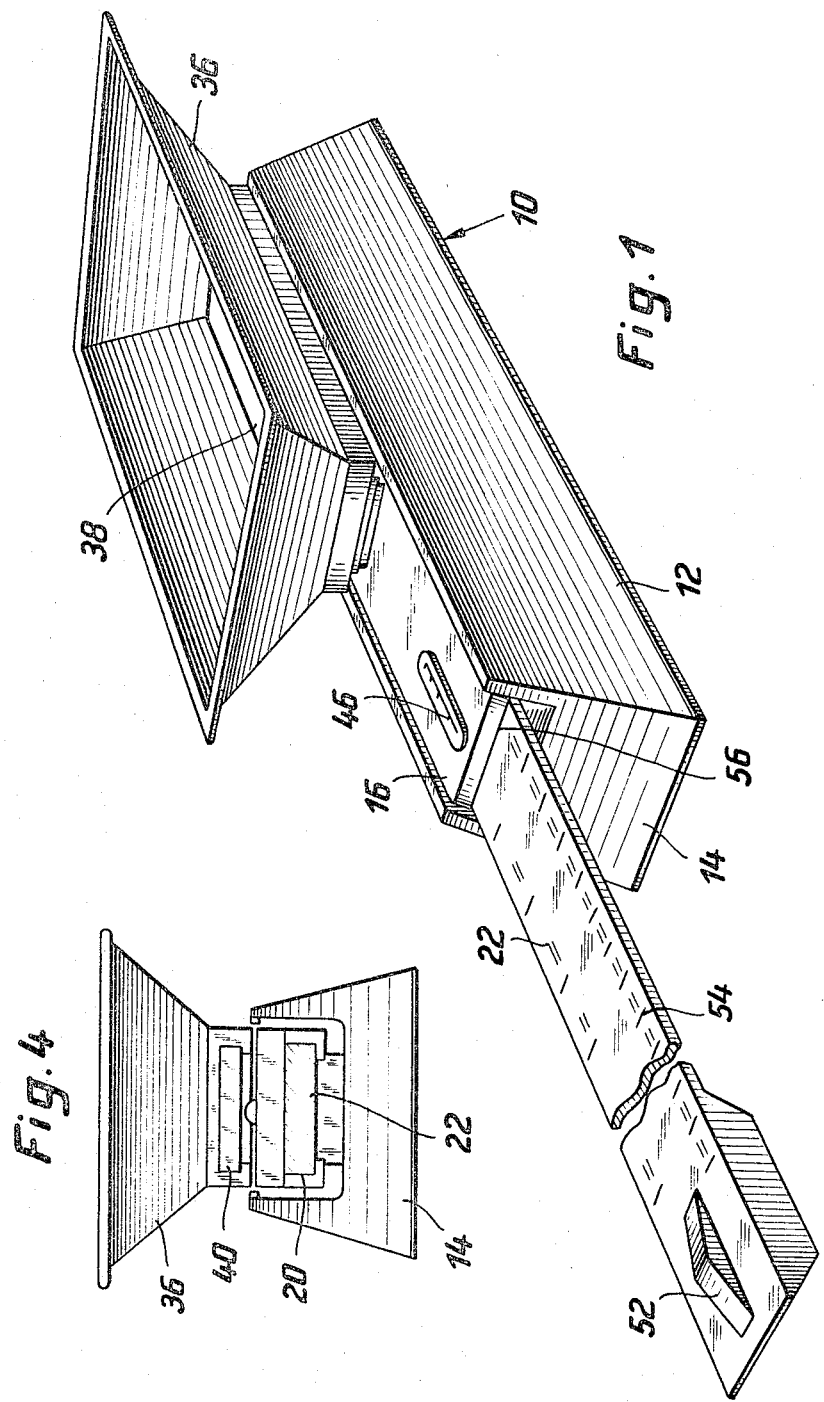

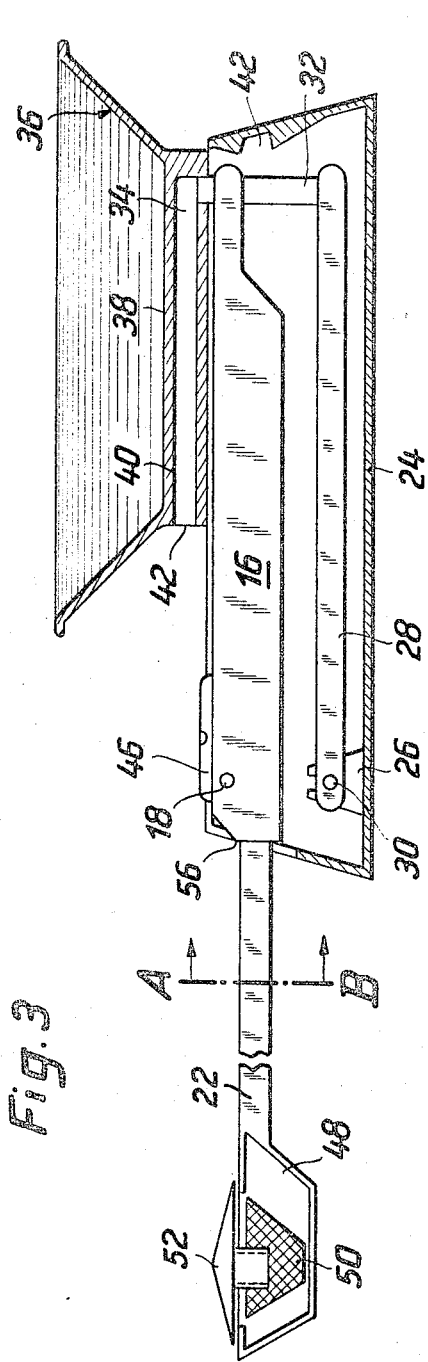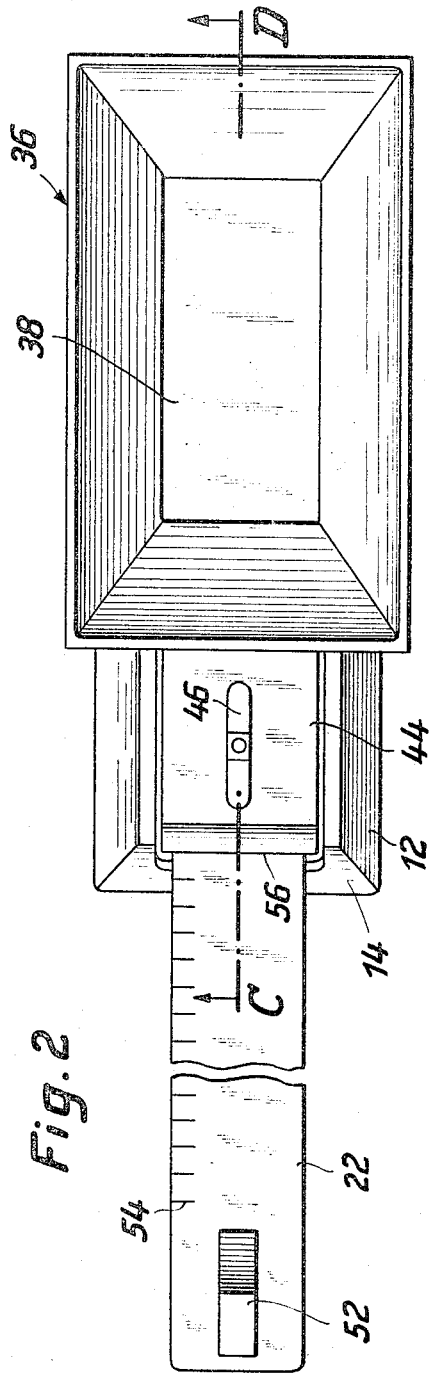

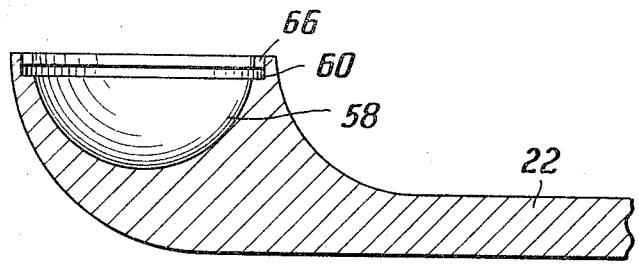
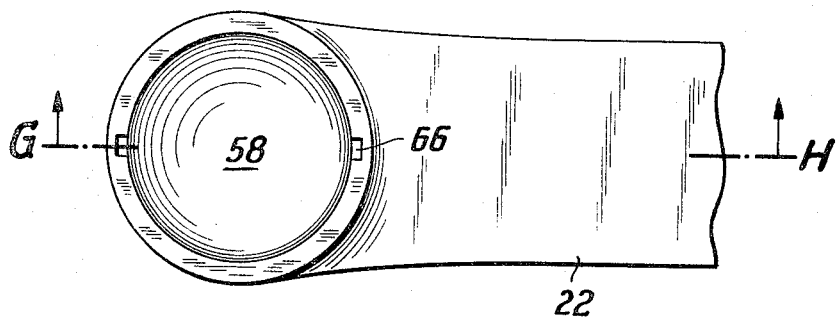
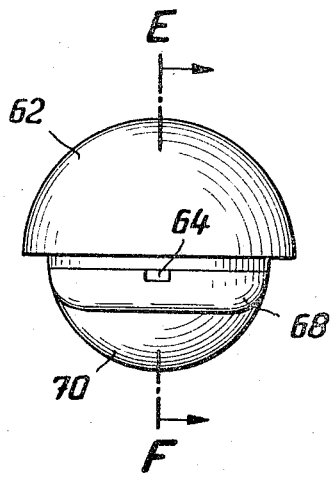
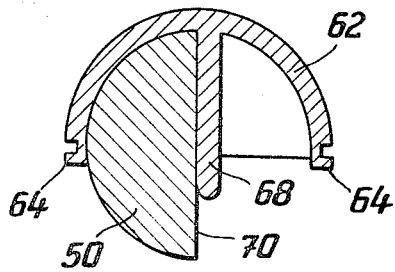

INVENTOR
Hermann von Rönn
BY
Beaman & Beaman
atty

United States Patent Office 3,334,698
Patented Aug. 8, 1967

3,334,698
LEVEL-BALANCE BEAM SCALE WITH ECCENTRICALLY MOUNTED COUNTERWEIGHT
Hermann von Rönn, Mittelweg 60,
Hamburg 13, Germany
Filed Nov. 18, 1965, Ser. No. 508,469
Claims priority, application Germany, Apr. 28, 1965,
R 30,528
4 Claims. (Cl. 177—171)

ABSTRACT OF THE DISCLOSURE

A beam balance including a pair of dissimilar arms, one of the arms being telescopically received within the other, the arms being pivotally supported and a spirit level being mounted upon the primary arm, while a compensating weight is mounted upon the telescopically supported arm.

---

In accordance with the invention, the beam scale is characterized in that the weight arm may be displaced in a recess extending longitudinally within the load arm. By this displacement of the weight arm the moment engaging at said arm may be changed until such time as the load placed onto the load arm will be balanced. The length of the weight arm projecting from the said load arm is an indication of the weight of the load. In this arrangement provision has been made for the load arm to be rotatably suspended from a housing by its one end.

In order to improve the oscillation properties, the load arm generally is angularly bent upwardly at the point of suspension. The axis of suspension extends through this angularly bent member.

In a preferred embodiment provision has been made for one end of the load arm to comprise an abutment member curved on the underside thereof longitudinally of the load arm. With this design of the load arm, said load arm may be brought into the horizontal position by stepwise displacement of the weight arm in which it is possible to estimate the additionally required displacement of the inclination still remaining after the displacement.

In a modification of the above embodiment it is provided that the abutment member may be displaced on the load arm and the load arm rigidly connected with the weight arm. Owing to the displacement of the integrally formed load and weight arm within the abutment member which is possible with this embodiment, the length ratio thereof may be changed until the weight and load arm are disposed in the horizontal plane.

In a preferred embodiment provision is made that the scale to receive the load may be displaced longitudinally of the load arm. In so doing, the scale may be arrested in several points spaced differently from the axis of rotation of the load arm so that various loads may be weighted with like weight moments.

In another preferred embodiment provision has been made for a journal to be attached to the load arm with differently shaped load scales adapted to be pushed thereon. The flexibility in use of the scales which it is aimed at makes it necessary that differently shaped scales be adapted to be fitted upon the load end. In this arrangement, care must be taken that the distance of the point of engagement of the load scale from the point of rotation of the load arm is independent of the load scale in use. Owing to the feature that all the scales are pushed onto the journal in the same manner, care is taken that the distance between the point of engagement of the load and the point of rotation is the same in all cases. Suitably, the journal will be arranged to extend parallel with the load arm. To push the load scale onto this journal, a longitudinally extending recess open at one end and having any desired cross sectional area is formed in the bottom of the load scale. Therefore, the load scale may be pushed onto the journal from the open end of the recess. The cross sectional area of the journal and the recess may, for instance, be of a T-shaped configuration or may be conical. It is guaranteed thereby that the scale may be neither lifted from the journal nor displaced thereon too easily.

In another embodiment, the scale to receive the load is rotatably suspended from the forked end of the load arm. In this case, the center of gravity of the scale lies below its axis of suspension so that it will always be disposed in the horizontal plane independently of the momentary inclination of the scales. This is of special importance when weighing liquids.

It is furthermore provided that the weight disposed in the weight arm is contained at that end thereof which projects from the load arm and may be displaced longitudinally of the weight arm. Because of this limited displacement of the weight it is possible to adjust the zero position. In this manner scales having slightly different weights may be tared and weight tolerances of the individual parts originating from manufacture be balanced.

Another embodiment provides for the weight to be rotatable about an axis non-parallel to the weight arm and not extending through the center of gravity of the weight. In this manner, the moment effective on the weight arm is changed, with a very exact adjustment of the zero position being possible through said rotation. Preferably, with this embodiment, the weight is in the form of a hemisphere rotatable about the diameter of the circular surface of said hemisphere extending vertically to the weight arm.

In a preferred embodiment of the invention, provision is made for an arm of a length equal to that of the load arm being rotatably suspended vertically below the load arm pivot point by its one end in the same manner as the load arm and rotatably connected by its other end to the one end of the load arm in parallel there with by means of a rotatably fitted strut supporting the journal at the upper end. This construction which works in accordance with the principle of the parallelogram offers the advantages that on the one hand it does not matter in the least to the weighing operation in what point of the scale the load is placed and that on the other hand the strut remains in the exact vertical position thereof also in all the unbalanced conditions so that also the load scale which is connected with the strut via the journal remains in the horizontal position. This is of especial importance if liquids must be weighed and the scale carries volume graduations on the inside. Suitably, the lower arm is supported at the side walls of the housing surrounding the arms. But it is also possible to provide a bearing block fastened to the housing to support the arm.

Suitably, on the inside of the housing wall opposite the load arm with the load arm extending in parallel with the housing bottom an arresting socket is provided flush with the load arm recess for the weight arm units completely pushed-in condition. Owing to this arresting automatically occurring in the zero position, an excess load on the rotatably supported members especially by shocks or oscillations is avoided. With this arresting, the weight arm and with it the load arm achieve a position in parallel with the housing bottom.

Preferably, the upper side of the weight arm is provided with at least one weight graduation. The graduation has to be arranged in such a manner that the weight of the load may be read on the outer edge of the load arm lying close to the upper side of the weight arm. It is of course possible to use one and the same scale with several weight arms containing different weights and graduations, or with different weights in one and the same weight arm so that the weight may be adjusted to new weighing ranges by exchange of the weight arms or weights, respectively. Suitably, there are two weight graduations of different weight units marked on the upper side of the weight arms. For instance, the one graduation may be gauged in ounces and the other one in grams thus according at the same time a conversion table for these measuring systems. It is furthermore provided to associate with the various fixed positions of the scale on the load arm various weight graduations or weight arms or weights. In this manner it is possible by increasing the distance of the scale from the pivot point of the scale, to elongate the reading scale on the weight arm thus increasing the accuracy of the weighing operation.

It is furthermore provided to arrange a transverse level on the upper side of the load arm, the weight arm or the abutment member to indicate the horizontal position, thereof. Owing to the parallelism of the load arm with respect to the housing bottom in the arrested condition, the scales provided with the transverse level may be used also as a level.

In the following, the invention will be described by way of one embodiment:

In the drawings,

FIG. 1 is a perspective view of the scale in accordance with the invention,

FIG. 2 is a plan view of the scale in accordance with FIG. 1,

FIG. 3 is a sectional view taken on line C-D of FIG. 2,

FIG. 4 is a front view in accordance with line A-B of FIG. 3,

FIG. 5 is a plan view on the end of the weight arm of another embodiment,

FIG. 6 is a front view of the weight arm in accordance with FIG. 5,

FIG. 7 is a sectional view taken on the line E-F of FIG. 6,

FIG. 8 is a sectional view taken on the line G-H of FIG. 5,

Figure 9:
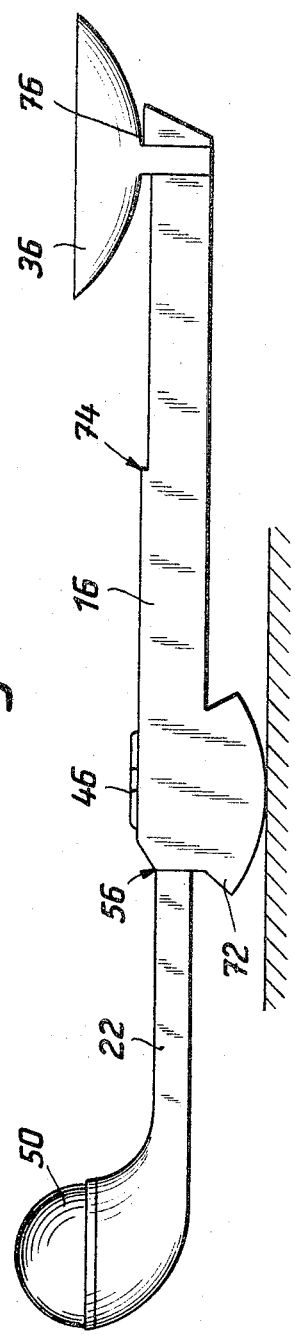
FIG. 9 is a side view of another embodiment of the scale in accordance with the invention.

In accordance with FIGS. 1-4 a load arm 16 is supported at the longitudinal walls 12 of the housing 10 with the aid of a shaft 18. The load arm 16 contains a T-shaped recess 20 opening towards the lower side of the arm with the weight arm 22 displaceably supported therein. A bearing trestle 26 is fastened at the bottom 24 of the housing 10 with a second arm 28 rotatably supported thereon. The axis 30 of rotation of the arm 28 is disposed exactly vertically below the shaft 18. The unsupported ends of the arms 16 and 28 are interconnected in such a manner that the arms 16, 28 are arranged in parallel with respect to each other through a strut 32 pivotable with respect to both arms with the connection points between the load arm 16 and the strut 32 or the arm 28 and the strut 32, respectively, being equally spaced from the shaft 18 or the axis 30 of rotation, respectively. In this manner it is obtained that the strut 32 extends vertically to the bottom 24 independently of the inclination of the load arm 16. The strut 32 carries a horizontal journal 34 at the upper end which serves to support a scale 36. The journal 34 has a T-shaped configuration, the scale contains a T-shaped longitudinally extending recess 40 in the bottom 38. The recess 40 in the bottom of the scale 36 opens towards one side 42 so that the scale may be pushed onto the journal 34. This embodiment allows for the exchange of the scale 36 against differently shaped containers or a flat plate. To determine the volume of the material to be weighed the weighing scale 36 may carry a volume graduation on the inside thereof. On the inside of the wall 14 opposite the weight arm 22 there is provided a conically narrowing arresting socket 42 with the end of the weight arm engaging therein in the zero position. The load arm 16 and the weight arm 22 are thereby arrested in such a manner that the surface of the load arm and the lower surface of the bottom 24 are extending in parallel with each other.

The upper surface 14 of the load arm 16 has a transverse level 46 arranged thereon indicating the horizontal position of the load arm 16 and, with the scale arrested also indicating the horizontal position of the bottom 24 of the housing. In this manner it is possible to make use of the scale as a level when in the arrested position.

The weight arm 22 is enlarged at its end and in the enlargement thereof contains a cavity 48 with a weight 50. The enlargement is formed to face downwardly on the under surface of the weight arm 22 so that the center of gravity of the weight 50 contained therein is at any rate disposed below the axis of rotation of the shaft 18. The weight 50 consisting for instance of lead is smaller than the cavity 48 and may be displaced therein by moving a key 52 rigidly connected with the weight. The displacement of the weight 50 which cannot take place by itself but only by actuation of the key 52, in certain limits, makes possible the adjustment of the balanced position so that the latter coincides with the zero position of a graduation 54 arranged on the upper surface of the weight arm 22. The reading of the weight of the load is effected at the edge 56 of the load arm 16.

FIGS. 5-8 show another manner of accommodating the weight 50 at the end of the weight arm 22. The weight arm 22 is enlarged at the end thereof and contains semi-spherically shaped recess with a groove 60 to hold a semi-spherically shaped closure lid 62. At the abutment surface of the lid there are arranged two diametrically opposed journals 64 to which the recesses 66 at the groove 60 correspond. The lid 62 comprises a wall 68 maintaining the circular surface 70 of the semi-spherically shaped weight 50 vertical. After insertion of the weight 50 and the lid 62 into the recess 58 or the groove 60, respectively, it is possible to move the hemisphere 50 by rotation of the lid 62 on a circular path. This changes the distance of the center of gravity of the weight 50 from the shaft 18 so that an adjustment of the balance is possible within certain limits.

Figure 10:
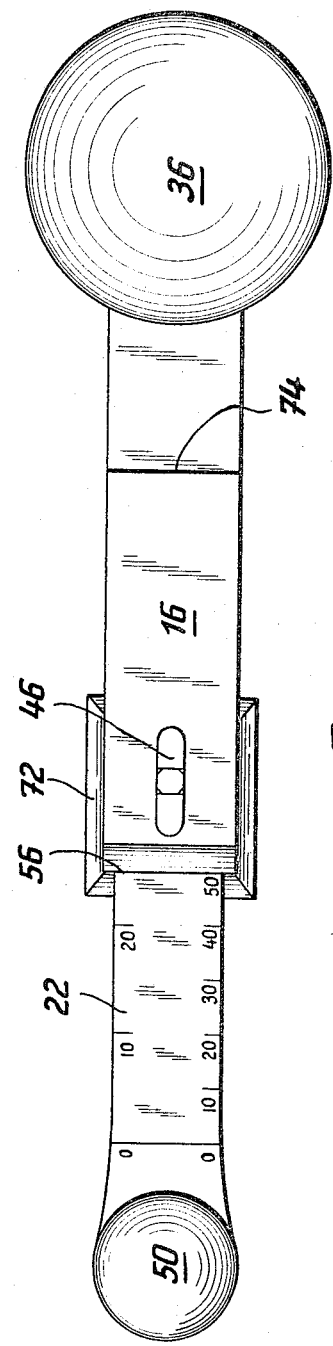
FIG. 10 is a plan view of the embodiment in accordance with FIG. 9.

With the embodiment in accordance with FIGS. 9 and 10 the one end of the load arm 16 is provided with an abutment member 72 constantly curved on the underside thereof longitudinally of the arm. With this embodiment, the load scale 36 is displaceable on the load arm 16 between two abutments 74, 76. The weight arm 22 carries two graduations. The upper, narrow range of the graduation corresponds to the position of the scale 36 at the abutment 76 and the lower range of the gradaution corresponds to the position of the scale 36 at the abutment 74. In the weighing operation, the weight arm 22 is displaced in the load arm 16 until such a time as the arms will have assumed the horizontal position which is read from the level 46. The weight may then be read at the edge 56.

What I claim is:

1. An arm balance comprising, in combination, a support member, a first longitudinal arm portion supported on said support member, load receiving means defined on said first arm portion, a second arm portion supported on said first arm portion and having an outer end spaced from said first arm portion, means pivotally supporting said support member for pivotal oscillation about an axis perpendicular to the length of said first arm portion, a recess defined in said second arm portion outer end having an axis transverse to the length of said second arm portion, a weight rotatably mounted within said recess eccentric to said axis and rotatable in a plane substantially parallel to the length of said arm portions, handle means associated with said weight permitting manual rotation of said weight within said recess eccentric to said axis, means permitting relative adjustment of said second arm portion to said support member in the longitudinal direction of said first arm portion, indicia defined on said second arm portion and indicia reference means fixed relative to said support member indicating the relative position of said second arm portion to said support member.

2. An arm balance as in claim 1 wherein said recess includes a circular groove concentrically disposed about said recess axis in a plane substantially parallel to the length of said first arm portion, a circular weight support rotatably mounted in said groove, said weight being mounted on said weight support eccentric to the axis of rotation thereof whereby rotation of said weight support longitudinally varies said weight with respect to said second arm portion and said handle being defined on said weight support.

3. In an arm balance as in claim 1 wherein said means pivotally supporting said support member comprises a convex arcuate surface defined on said support member adapted to engage a substantially flat supporting surface.

4. In an arm balance as in claim 1 wherein an elongated spirit level is mounted upon said support member, said level being disposed in the longitudinal direction of said first arm portion indicating the horizontal relationship thereof.

References Cited

UNITED STATES PATENTS

| 460,147 | 9/1891 | Miles | 177—126 XR |
| 2,383,408 | 8/1945 | Morgan | 177—236 |

FOREIGN PATENTS

| 16,192 | 1888 | Great Britain. |
| 473,381 | 10/1937 | Great Britain. |

RICHARD B. WILKINSON, *Primary Examiner.*

R. S. WARD, *Examiner.*